United States Patent Office 3,790,542
Patented Feb. 5, 1974

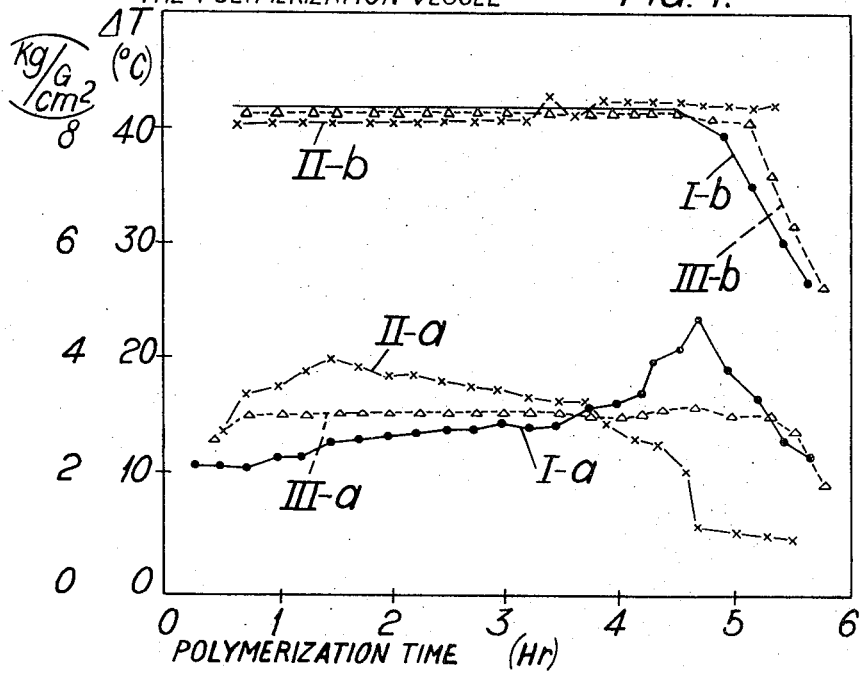
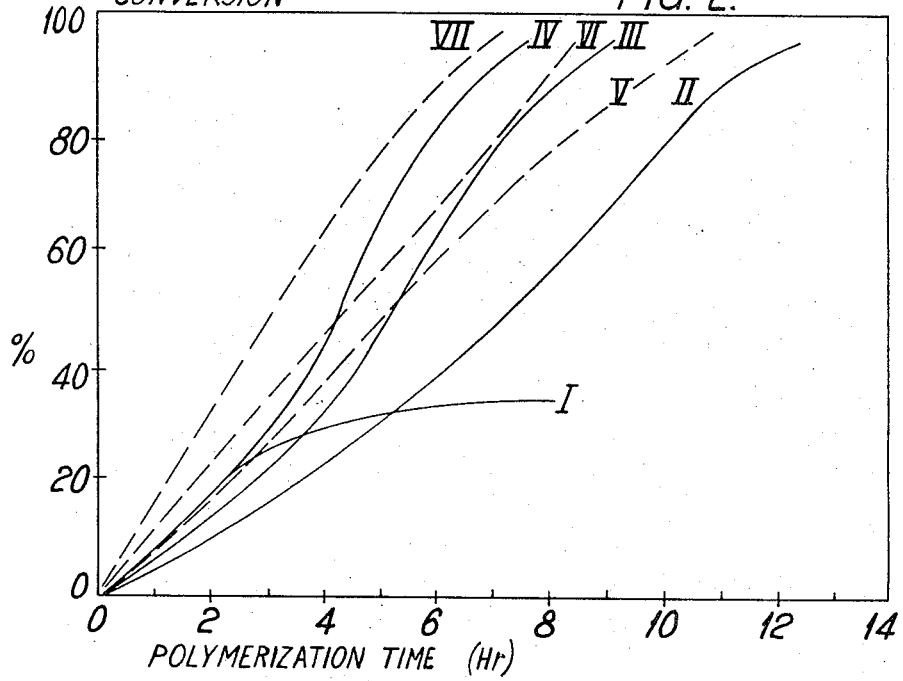

3,790,542
METHOD FOR POLYMERIZING VINYL CHLORIDE
Shunichi Koyanagi, Naoetsu-shi, Hajime Kitamura, Niigata-ken, Kinya Ogawa, Naoetsu-shi, and Toshihide Shimizu, Niigata-ken, Japan, assignors to Shinetsu Chemical Company
Filed Sept. 15, 1970, Ser. No. 72,446
Int. Cl. C08f 1/60
U.S. Cl. 260—92.8 R                          1 Claim

ABSTRACT OF THE DISCLOSURE

The polymerization is conducted in a medium which does not dissolve the produced polymer or copolymer. It is also conducted in the presence of a polymerization catalyst comprising acetyl cyclohexyl sulfonyl peroxide and a member selected from the group consisting of tertiary butyl peroxypivalate, diisopropyl peroxydicarbonate, di-2-ethylhexyl peroxydicarbonate, $\alpha,\alpha$-azobis-2,4-dimethylvaleronitrile and mixtures thereof.

---

This invention relates to an improved method for polymerizing vinyl chloride monomer, or a mixture of vinyl monomers containing vinyl chloride as its main component, in a dispersion medium which does not dissolve vinyl chloride polymer or vinyl chloride copolymer.

It is generally known that in a heterogenous polymerization reaction of vinyl chloride or a mixture of vinyl monomers containing vinyl chloride as its main component, the reaction rate suddenly increases when a high conversion of polymerization is reached and an S-shaped reaction curve is obtained. Such a phenomenon of self-accelerating the reaction rate is generally called "Gel Effect" or "Trommsdorff Effect." It gives rise to a number of disadvantages in the production of vinyl chloride polymers. As yet no solution has ever been found to the problem. Since such a phenomenon is inevitable, the maximum capacity of the polymerization vessel is expressed by its cooling capacity when the reaction is at its peak—in other words, when the reactants give off the greatest heat. Thus the cooling capacity of the polymerization vessel depends upon the amount of the reaction heat at the time the "Gel Effect" is observed. Consequently, although no great cooling is required either before or after the "Gel Effect" takes place, ample room must be given to its cooling capacity, when a polymerization vessel is planned.

In carrying out the polymerization of vinyl chloride in the presence of an ordinary catalyst such as lauroyl peroxide, benzoyl peroxide or azobisisobutylonitrile, which gives a vehement "Gel Effect," the polymerization time cannot be much reduced, and if any attempt is made to reduce it even a little, a sudden exothermic reaction will take place at the time the "Gel Effect" is observed, making it difficult to control the polymerization temperature, and resulting in a rise of the temperature within the vessel. This may cause the coloration and deterioration of heat stability of the resultant polyvinyl chloride. What is worse, the generation of fine glassy particles caused by melting of the polyvinyl chloride due to this heat, will deteriorate the gelling property of the product at the processing stage. This brings about various disadvantages such as the appearance of fish eyes, etc.

The "Gel Effect" is caused as follows. In the heterogenous polymerization of vinyl compounds, the polymer radicals generated by the initiation reaction are separated from the monomer phase and get precipitated, thereby providing reaction centers outside the monomer phase. The solid polymer radicals separated from the monomer phase make it difficult for the bimolecular termination to take place. This results in a slowing down of the termination rate and contributes to the accumulation of the radical concentration throughout the polymerization system. Moreover it extraordinarily increases the reaction velocity toward the end of the polymerization.

In order to reduce the whole reaction time by controlling this "Gel Effect," such a method has been proposed as to raise the initial reaction rate by employing a radical polymerization catalyst having a high decomposition rate or good initiation effect so that the polymerization may take place at a comparatively high concentration from the start, for the purpose of mitigating the extraordinary accumulation of the polymer radical concentration in the latter part of the polymerization. Diisopropylperoxydicarbonate for example is recommended as a catalyst to meet such purpose. However, it has a low decomposition temperature, and makes the control of the polymerization reaction difficult. Sometimes it even causes an explosive polymerization reaction to take place so that it is not a very satisfactory catalyst from the point of the control of the "Gel Effect."

Acetyl cyclohexyl sulfonyl peroxide is known as a catalyst whose polymerization initiation velocity is extremely great. However, when a large amount of it is used, the reaction proceeds very rapidly in the early stage of the polymerization. This causes a sudden rise either in temperature or pressure, which cannot be controlled on an industrial scale. If a small amount of this catalyst is used, the above-mentioned difficulty can be overcome, however a low conversion of polymerization will be obtained because the catalyst will disappear in the course of the reaction. Therefore, in the heterogenous polymerization of vinyl chloride, it is next to impossible to achieve a great reduction of polymerization time merely by increasing the amount of the catalyst employed. What is needed is the development of entirely new catalysts.

The present invention relates to a method for polymerizing vinyl chloride monomer or a mixture of vinyl monomers containing vinyl chloride as its main component, which is characterized by polymerizing said monomer in a medium which does not dissolve the polymer or copolymer to be prepared from said monomer, by employing as polymerization catalysts a combination of acetyl cyclohexyl sulfonyl peroxide and any members selected from the group consisting of tertiary butyl peroxypivalate, diisopropyl peroxydicarbonate, di-2-ethylhexyl peroxydicarbonate and $\alpha,\alpha$-azobis-2,4-dimethylvaleronitrile.

It is a well known fact that acetyl cyclohexyl sulfonyl peroxide (ACSP) is employed as a catalyst together with either lauroyl peroxide (LPO) or azobisisobutylonitrile (AIBN) in the polymerization of vinyl chloride. But in this case, ACSP is consumed in the early stage of the polymerization reaction, and LPO or AIBN, which is slow in decomposition rate virtually shows a polymerization effect only near the end of the polymerization, so that in the middle of the polymerization reaction, a proper radical concentration is hardly maintained. This makes the polymerization rate high both in the early and late stages of the polymerization, and low in the middle of it. Consequently, the polymerization velocity cannot be kept uniform throughout the course of the polymerization process.

By studying the combinations of the catalysts, we observed that when the combinations of catalysts whose use characterizes the present invention were employed, the polymerization rate could be kept constant throughout the whole process. This makes it possible to control the polymerization reaction and reduce the total polymerization time. A product which is heat-stable, free from fish eyes, and which possesses fine processability, can be obtained at good yield. Furthermore, the amounts of the catalysts employed in combination were comparatively small.

The reason why such a good effect is obtained has not been made theoretically clear as yet, but it might be because the introduction period and the decomposition rate of each of the catalysts have desirable divergence in point of time and that throughout the whole process the catalysts function synergistically.

The amount of ACSP employed in practicing the method of the invention can freely be chosen in accordance with the polymerization method. However it is usually advisable to make it from 0.001 to 0.1 part by weight based on the total weight of vinyl chloride monomer or the mixture of vinyl monomers. The amounts of the other substances which are employed, as for example tertiary butyl peroxy pivalate (BPP), diisopropyl peroxy dicarbonate (IPP), di-2-ethylhexyl peroxy dicarbonate (OPP), and $\alpha,\alpha'$-azobis-2,4-dimethyl-valeronitrile (ADVN), are chosen with a view to making the polymerization reaction proceed most uniformly, when used in combination with ACSP, vis, in accordance with the decomposition velocity and polymerization reactivity of the catalyst. Furthermore, consideration must be given to the coloring of the resultant polyvinyl chloride and to the reduction of its heat- and photo-stability. Thus it is desirable to make the amounts of such catalysts at most 1% by weight based on the total amount of the vinyl chloride monomer or of the mixture of vinyl monomers.

The method of the invention is very effective when vinyl chloride monomer or a mixture of vinyl monomers containing vinyl chloride monomer as its main component is subjected to suspension polymerization in a water medium or to a heterogenous polymerization in a medium which does not dissolve the vinyl chloride polymer.

When the method of the invention is to be practiced by suspension polymerization, at least one of the following substances should be employed as a suspension agent or dispersant: synthetic polymers such as polyvinyl alcohol, cellulose ethers such as methyl cellulose, polyvinyl pyrrolidone, polyvinyl methylether and copolymers of maleic anhydride with vinyl acetate or styrene; natural polymers such as starch, gelatine, tragacanth gum, and gum arabic; water-insoluble salts such as calcium phosphate, calcium oxalate, barium sulfate, talc, and bentonite; and nonionic surface active agents.

When the method of the invention is to be practiced in an organic solvent which does not dissolve polyvinyl chloride, such a medium must be selected from the group of organic medium consisting of alcohols such as methanol, ethanol, butanol and propanol; aliphatic hydrocarbons such as butane, pentane, hexane, and octane; aromatic hydrocarbons such as benzene, toluene, and xylene; and chlorinated hydrocarbons such as methyl chloride and methylene chloride.

The kind of said organic solvent to be employed is dependent upon the compositions of the vinyl chloride polymer or the vinyl chloride copolymer to be prepared. When a mixture of monomers consisting of at most 70% by weight of vinyl chloride and at least 30% by weight of vinyl acetate are polymerized at a temperature of at least 50° C., the copolymer prepared will be soluble in various kinds of organic solvents. Therefore the use of benzene, toluene or methylene chloride is not recommended.

Vinyl monomers which are copolymerizable with vinyl chloride by the method of the invention are exemplified by vinyl esters, vinyl ethers, acrylic acids, methacrylic acids and their esters, maleic acids or anhydrides and esters thereof, aromatic vinyl monomers, vinylidene halides, vinyl halides excepting vinyl chloride, and monoolefine.

The invention will now be described with reference to the following examples and to the attached figures in which FIG. 1 shows the change with the lapse of time of the pressure within the polymerization vessel and the change also with the lapse of time of $\Delta T$—the difference between the temperature within the polymerization vessel and the temperature of the water in the jacket, when $\alpha,\alpha'$-azobis-2,4-dimethylvaleronitrile and acetyl cyclohexyl sulfonyl peroxide were used as polymerization catalysts, and FIG. 2 shows the relation between the polymerization time and the rate of conversion when acetyl cyclohexyl sulfonyl peroxide and diisopropyl peroxydicarbonate were employed as polymerization catalysts.

EXAMPLE 1

In a 1,000 liter stainless steel polymerization vessel were placed 250 g. of polyvinyl alcohol, 500 liters of water, 250 kg. of vinyl chloride monomer and one of the following polymerization catalysts: (i) 100 g. of ADVN, (ii) 62.5 g. of ACSP, and (iii) a mixture of 75 g. of ADVN and 30 g. of ACSP, and three kinds of polymerizations were carried out, each at 56° C. The change with the lapse of time of the pressure inside the polymerization vessel and that of $\Delta T$—the difference between the temperature inside the polymerization vessel and the temperature of the water in the cooling jacket—were measured. The results obtained are given in Table 1. When the ADVN alone was employed as a catalyst, a sudden exothermic reaction was observed to take place about 5 hours after the start of the polymerization reaction. This raised the $\Delta T$ value. When ACSP alone was used as a catalyst, the pressure inside the polymerization vessel remained at 8.5 kg./cm.$^2$ G, and the polymerization reaction was suspended, although the value of $\Delta T$ was reduced 4 hours after the start of the polymerization reaction. But when the mixture of ADVN and ACSP was employed, the $\Delta T$ value became mostly constant about 1 hour after the start of the polymerization reaction, showing that the "Gel Effect" was well under control, and the pressure inside the polymerization vessel was reduced to 5 kg./cm.$^2$ G about 6 hours after the start of the polymerization reaction, proving that a sufficiently high rate of polymerization had been achieved. Referring now to the figures, the curves in the figures represents the following:

I–a: $\Delta T$ when ADVN was employed.
I–b: Pressure inside the vessel when ADVN was employed.
II–a: $\Delta T$ when ACSP was employed.
II–b: Pressure inside the vessel when ACSP was employed.
III–a: $\Delta T$ when the mixture of ADVN and ACSP was employed.
III–b: Pressure inside the vessel when the mixture of ADVN and ACSP was employed.

The properties of polyvinyl chlorides prepared by the polymerizations are shown in Table 1. They prove that the polyvinyl chloride prepared by the method of the invention is especially superior in heat stability.

TABLE 1

| Catalyst | Control | | Example of the present invention—ADVN and ACSP |
|---|---|---|---|
| | ADVN | ACSP | |
| Distribution of particle sizes: | | | |
| 60 mesh pass | 94.6 | 98.3 | 98.5 |
| 100 mesh pass | 78.2 | 65.3 | 70.3 |
| 200 mesh pass | 2.3 | 2.0 | 1.9 |
| Average degree of polymerization | 1,090 | 1,100 | 1,100 |
| Heat stability (minutes) | 100 | 100 | 120 |

NOTE.—Heat stability test: To 100 parts by weight of polyvinyl chloride were added 1.5 parts by weight of dibutyltin maleate and 0.5 part by weight of stearic acid, and the mixture was kneaded for 10 minutes on a roll at 170° C. It was then processed into a sheet, which was then heated in Gear's oven at 180° C. The time which elapsed before the sheet became colored was employed to denote the heat stability of the sheet.

EXAMPLE 2

Polymerization of vinyl chloride was conducted just as in Example 1, except that various amounts of IPP and ACSP were employed as catalysts either alone or in mixture. The results obtained with regard to the relation between the rate of conversion and the polymerization time are shown in FIG. 2. As is clear from said FIG. 2, when IPP was added to ACSP in the ratio of 1.0–2.5:1, by weight, hardly any "Gel Effect" was observed, and a high polymerization yield was obtained (cf. Curves V, VI, and VII).

The reference numbers on the curves show that the polymerization catalysts employed were as follows:

|     |                              | Amount added, percent [1] |
|-----|------------------------------|---------------------------|
| I   | ACSP (called Catalyst No. 1) | 0.01                      |
| II  | IPP (called Catalyst No. 2)  | 0.015                     |
| III | do                           | 0.02                      |
| IV  | do                           | 0.03                      |
| V   | Catalyst No. 1               | 0.01                      |
|     | Catalyst No. 2               | 0.01                      |
| VI  | Catalyst No. 1               | 0.01                      |
|     | Catalyst No. 2               | 0.015                     |
| VII | Catalyst No. 1               | 0.01                      |
|     | Catalyst No. 2               | 0.025                     |

[1] Based on the amount of vinyl chloride.

EXAMPLE 3

In a 1,000 liter stainless steel polymerization vessel were placed 170 kg. of vinyl chloride, 30 kg. of vinyl acetate, 200 g. of polyvinyl alcohol, 100 g. of methylcellulose (viscosity of 2% aqueous solution at 20° C.: 50 cps.), 400 kg. of water and 40 kg. of n-hexane, together with one of the three kinds of polymerization catalysts given in Table 2, and the polymerization was carried out at 57° C. The ΔT value—the difference between the temperature inside the polymerization vessel and the temperature of the water in the cooling jacket—the yield of the product and the polymerization time are shown in Table 2.

TABLE 2

| Catalyst (percent based upon the mixture of monomers employed) | Control ACSP (0.03%) | OPP (0.02%) | Example of the present invention—ACSP (0.012%) and OPP (0.015%) |
|---|---|---|---|
| Polymerization time (hr.) | 20 | 16 | 14 |
| Maximum ΔT (° C.) | 12 | 14 | 10 |
| Yield (percent) | 68 | 92 | 94 |

EXAMPLE 4

Experiments were conducted similar to those in Example 1, except that the catalysts employed were as given in Table 3. The results obtained are shown in Table 3.

TABLE 3

| Catalyst (amount) | Control—BPP (100 g.) | Example of the present invention—ACSP (32.5 g.) and BPP (75 g.) |
|---|---|---|
| Polymerization time (hr.) | 6.5 | 6.0 |
| Maximum ΔT (° C.) | 20 | 13 |
| Yield (percent) | 93 | 92 |

What is claimed is:

1. In a method for polymerizing vinyl chloride monomer or a mixture of vinyl monomers containing vinyl chloride monomer as its main component to produce a polymer or a co-polymer in a medium which does not dissolve said polymer or co-polymer, the improvement which comprises carrying out the polymerization in the presence of a catalyst mixture comprising acetyl cyclohexyl sulfonyl peroxide and $\alpha,\alpha'$-azobis-2,4-dimethylvaleronitrile.

References Cited

UNITED STATES PATENTS

| Re. 25,763 | 4/1965 | Marous et al. | 260—92.8 W |
| 2,975,162 | 3/1961 | Iloff | 260—92.8 W |
| 3,205,204 | 9/1965 | Heckmaier et al. | 260—92.8 W |
| 3,375,238 | 3/1968 | Bauer et al. | 260—92.8 W |
| 3,592,800 | 7/1971 | Oschmann | 260—92.8 W |

STANFORD M. LEVIN, Primary Examiner

U.S. Cl. X.R.

260—23 XA, 86.3, 87.1, 87.5 C, 87.5 R, 92.8 W